United States Patent
Lemay et al.

(10) Patent No.: US 6,527,557 B2
(45) Date of Patent: Mar. 4, 2003

(54) SYSTEM AND METHOD FOR INFERRING MENTAL REPRESENTATIONS OF INDIVIDUALS BY SUCCESSIVE COMPARISON OF ITEMS

(75) Inventors: Philippe Lemay, Montreal (CA); Valëry Allegro, Sion (CH)

(73) Assignee: Interqualia, Inc., Montreal (CA)

( * ) Notice: Subject to any disclaimer, the term of this patent is extended or adjusted under 35 U.S.C. 154(b) by 0 days.

(21) Appl. No.: 09/962,269

(22) Filed: Sep. 25, 2001

(65) Prior Publication Data

US 2002/0132210 A1 Sep. 19, 2002

Related U.S. Application Data

(60) Provisional application No. 60/234,988, filed on Sep. 25, 2000.

(51) Int. Cl.[7] .................... G09B 19/00; G09B 7/00; G06F 17/60
(52) U.S. Cl. .................. 434/236; 434/237; 434/322; 705/10
(58) Field of Search ................... 434/219, 236, 434/237, 238, 322, 323, 353, 362; 705/10

(56) References Cited

U.S. PATENT DOCUMENTS

| | | | | |
|---|---|---|---|---|
| 4,627,818 A | * | 12/1986 | Von Fellenberg | 434/236 |
| 5,882,203 A | * | 3/1999 | Correa et al. | 434/236 |
| 6,007,340 A | * | 12/1999 | Morrel-Samuels | 434/107 |
| 6,189,029 B1 | * | 2/2001 | Fuerst | 705/10 |
| 6,236,975 B1 | * | 5/2001 | Boe et al. | 705/10 |
| 6,430,539 B1 | * | 8/2002 | Lazarus et al. | 705/10 |

* cited by examiner

Primary Examiner—John Edmund Rovnak
(74) Attorney, Agent, or Firm—Altera Law Group LLC

(57) ABSTRACT

A method for inferring mental representations by successive comparison of items is disclosed. The method incorporates the steps of (a) presenting a series of N items to a participant; (b) asking the participant to compare each pair of items, where each item is compared with its immediate neighbour, except for the items at the two extremes which are compared to one another, so that each item is used in a pair twice, and N comparisons are done; (c) ordering the items by matrix iteration in order to obtain a new sequence of items; elaborating a new list of N/2 paired items, on the basis of immediate neighbours, taking each item only once; (e) asking the participant to compare each pair of items elaborated in step (d); (f) integrating the responses of steps (a) to (e) into a matrix; and (f) finally ordering the items based on the matrix obtained in step (f). The present invention is particularly useful for surveying purposes, among others.

3 Claims, No Drawings

SYSTEM AND METHOD FOR INFERRING MENTAL REPRESENTATIONS OF INDIVIDUALS BY SUCCESSIVE COMPARISON OF ITEMS

This application claims the benefit of U.S. provisional application No. 60/234,988, filed Sep. 25, 2000.

FIELD OF THE INVENTION

The present invention concerns a system and method that allows one to discover how an individual mentally represents a domain described by a series of items. Specifically, the goal is to determine how these items are ordered mentally by asking a certain number of questions in a comparative manner, by taking into account the distance between items, by minimizing the number of questions asked, and by taking into account the inconsistencies in the mental representation of the domain investigated.

BACKGROUND OF THE INVENTION

When a person orders a series of items on a numerical scale through a series of answered questions, the answers given may be inconsistent or unstable. In other words, the relation given between items A and B, between B and C, and by A and C may not be totally transitive. In this light, how is it possible to assure that the final order of the N items is as consistent as possible with the representation system for the items done by the individual, in a minimum amount of questions, and by taking into account the distance between the items ? This is the problem addressed by the system and method of investigation and of analysis called QualiaSort.

Context

In the social sciences and particularly within psychology, there exists many ways to ask questions on a given topic. For one, an individual can freely and verbally answer open questions on a given topic. Secondly, closed questions can be presented where there are a given number of possible answers. These questions can involve yes/no answers, multiple nominal choices (several possible answers without any order amongst them), ordinal choices (an existing grade amongst these choices), and choices on a numerical scale.

In the last case, the goal of statistic questioning is often to construct a scale on a specific dimension relevant to the circumscribed domain. Subsequently, this scale will permit to position an individual relative to others in the same age group, sex group, social class group, etc.

Equally useful could be the construction of a given order amongst these items. We can consider for instance, marketing surveys seeking to know the preferences of consumers for certain brands of detergents or cars.

Existing Methods

Several method of asking questions have been developed over the years in the domain of social sciences in order to classify a list of items in an increasing sequence. For example, the task of an individual can be to directly order a list of N items in an increasing, by assigning each item a number between 1 and N, without any items having the same rank. This method is advantageous since the procedure is easy to understand by the participants and the answers given are clear-cut. The major inconvenience is the absence of information on the distance between items; two successive items can be very distant while they follow one another in the sequence. Another limiting aspect is the fact that items can be ordered in function of importance while they may not be important at all to the participant. Last but not the least, individuals have difficulty handling a large number (roughly more than 7) of items simultaneously when attempting to make out a global idea of a list of items. In conclusion, this method of asking questions suffers from sever limitations, without mentioning the weak performance from the statistical techniques used for analysing ordinal type data such as in the present case.

Another method simply consists of assigning a value or intensity to the preference of each item such as on a scale from 1 to 10, for example. The main advantage is the speed and easiness in which the data can be manipulated. The disadvantage is that the values assigned are not easy to compare from one individual to the next. Is the internal scale adopted by each equivalent, that is, is a 3 and a 7 on a scale from 1 to 10 represent the same intensity for all participants ? We can doubt of this.

Another inconvenient concerns the "natural" aspect of the measure. When an individual questions his preference between two competing brands, how will he solve the problem? Will he assign a score to each brand and then keep the one with the highest score? Or will he simply ask himself which one he prefers? The one on the left or the right? Will I eat a steak or pizza? Will I go to the movies or rent a video? It seems more natural to compare two items at a time and choose the item that has the highest intensity for the "variable" or dimension examined.

Comparative Methods

Interrogation methods by comparisons are not recent. They usually serve, as mentioned earlier, to construct a score on one dimension. The fact of conducting several comparisons of elements from similar categories makes it possible to establish the preference for a particular category.

For example, the Myer-Briggs test establishes a global profile on several dimensions (perception vs. sensation, intuitive vs. analytical, etc) by proposing several pairs of expressions that polarizes one or the other of the dimensions.

When the problem concerns the comparison of items with the goal of establishing their sequence in an increasing order, especially when the number of items is significant, it is important to find an appropriate method of asking questions that takes into account the cognitive limits of individuals.

These cognitive limitations are crucial since it dictates how the method of asking questions should be structured. The most important of these limitations is the fact that individual representations of a particular domain are not necessarily coherent or mathematically transitive. If someone evaluates their level of preference, or the intensity of their desire, or any other measure commonly referred to as a mathematical or statistical "distance" between two items A and B by a value $d[A,B]$, and that between B and C as $d[B,C]$, then the measure between A and C will not necessarily be equivalent to the sum of $d[A,B]$ and $d[B,C]$.

The absence of coherence between the representations is the source of many difficulties in terms of investigation. If all of the relations would be perfectly transitive, then in order to determine the distance between each item, it would suffice to compare items that are neighbours ($x_i$ and $x_{i+1}$ for all i between 1 and N). In order to determine the distance, say between item 7 and item 25, it would be sufficient to add the distance between each item separating these items ($d[7,8]$+ $d[8,9]$+$d[9,10]$+ . . . +$d[24,25]$). The result would be precise while adopting the most synthetic evaluation procedure. Unfortunately, since these relations are not purely transitive, the procedure must be improved to take this limitation into account.

Another major limitation is tied to the cognitive overload involved in each method of asking questions. The individuals having to respond to a questionnaire, be it in on paper or on electronic form, cannot stay concentrated on a similar task for a long period of time. Hence, it is desirable to limit the number of questions to reduce the risk of fatigue or stress, which would probably reduce the reliability of the answers provided. If this limitation would not exist, researchers could permit themselves the luxury of asking hundreds of questions without any concerns for the performance of the participants.

SUMMARY OF THE INVENTION

An object of the invention is an investigative and analytical method based on comparisons of pairs. The goal is to order a relatively long list of items while taking into account the absence of perfect coherence in the individual's representations as well as restricting the number of questions. Such a system can be used for example, for marketing surveys on individual's preferences for different brands of cars, in industrial psychology for measuring an individual's abilities relative to a series of activities done in a professional context, in clinical psychology for measuring all auto-perceptions for a particular domain, or in various investigations where we want to rapidly determine the opinion (universe of representations) of individuals on a particular topic.

In accordance with the invention, this object is achieved with a method for inferring mental representations by successive comparison of items, comprising the steps of:

(a) presenting a series of N items to a participant;

(b) asking the participant to compare each pair of items, where each item is compared with its immediate neighbour, except for the items at the two extremes which are compared to one another, so that each item is used in a pair twice, and N comparisons are done;

(c) ordering the items by matrix iteration in order to obtain a new sequence of items;

(d) elaborating a new list of N/2 paired items, on the basis of immediate neighbours, taking each item only once;

(e) asking the participant to compare each pair of items elaborated in step (d);

(f) integrating the responses of steps (a) to (e) into a matrix; and (g) finally ordering the items based on the matrix obtained in step (f).

DESCRIPTION OF A PREFERRED EMBODIMENT OF THE INVENTION

The method according to a preferred embodiment of the invention unfolds in 6 successive steps.

Consider a set of N items where each item $\{x_i: i=1 \ldots N\}$ must be ordered in increasing order on a given dimension. These items could be pre-classed in a particular order (for example, if there exists a pre-defined categorization) or randomised (before each procedure, so that no participant has the same list to order)

Step 1: First Round of Questions 1.a

In the first step, the system presents the complete series of N items to the participant in order to compare them according to the following scheme: each item $x_i$ is compared with its immediate neighbour $x_{i-1}$ and $x_{i+1}$, except for the items at the two extremes $x_1$ and $x_N$, which are compared with one another. Furthermore, if the comparison between $x_i$ and $x_{i-1}$ is done, then the comparison between $x_{i-1}$ and $x_i$ is not done. In total, N comparisons are done and each item is used 2 times.

1.b

In order to avoid a too linear presentation of the items and that the sequence of comparisons between $x_1$ and $x_2$, $x_2$ and $x_3$, $x_3$ and $x_4$, ..., doesn't cause the participant to do too systematic inferences, it is preferable to randomise the order of the pairs presented. Consequently, the system will present for instance, the comparisons $x_{11}/x_{12}$, $x_4/x_5$, $x_{17}/x_{18}$, ... etc. step Step 2: Ordering Items by Matrix Iteration After this first step, a first sequence can be made. The idea is the following:

2.a

It consists of a procedure called a "matrix iteration". The starting point is the list of comparisons done by the participant and the values assigned. There are N trinomes (the 2 items compared and the value assigned) expressed by $(x_i, x_j, d_{ij})$ where $i<>j$ and $d_{ij}$ is the value (distance) assigned to item i relative to item j. This list of trinomes is transformed into a matrix that has as identifiers to the rows and columns, the identification number of the items, which results in a square matrix N×N. Within the cells will be placed the value $d_{ij}$ for all comparisons done. The value $d_{ij}$ is inscribed in the cell that is located in row i and column j.

2.b

For all comparisons not done, a value is assigned. By symmetry, the value $d_{ji} = -d_{ij}$ and lastly, $d_{ji} = 0$ for all i=j 2.c Once the matrix is completed, an iterative procedure enables the positioning of all items one versus another. Two hypotheses support this procedure:

1. if we know the position of A relative to B, and B relative to C, we should by inference (principle of transitivity) be able to calculate the distance between A and C;

2. if we can infer the position of A to C by many routes (say by B, D, E and F, ...), the most reasonable distance consists of calculating the average of these inferences. The average distance is represented by $d'_{ij}$.

The average distance is calculated the following way:

$$d'_{ij} = \frac{\sum_k (d_{ik} + d_{kj}) \forall k \in I_{ij}}{n_{ij}}$$

$I_{ij}$ is the set of routes from item i and j, and $n_{ij}$ is the number of routes between i and j or the number the number of elements in set $I_{ij}$.

2.d

This procedure must be repeated several times for all cells of the matrix in order to "cascade" the inferences from one cell to another. It is important that each evaluation can link each cell (according the theory of Markov chains, the matrix must be "non-absorbing"). The procedure may terminate when the difference between two successive matrix states is not significant (about 3 iterations after having completed the first matrix).

At the end of the iterations, the items are ordered in an increasing order according to their values in the final matrix. Hence, we obtain a new sequence of items $x'_i$: i=1 ... N.

Step 3: Elaboration of a New List of Paired Items 3.a

In the third step, a series of N/2 pairs of items are elaborated. By respecting the principle of similarity, these pairs are selected on the basis of immediate neighbours, but without taking the same item twice as in the first step. The system groups items $x'_i$ with $x'_{i+1}$ for i=1, 3, 5, 7, . . . etc (which groups $x'_1$ with $x'_2$, $x'_3$ with $x'_4$, but avoids grouping $x'_2$ with $x'_3$, $x'_4$ with $x'_5$, . . . etc).

3.b

The elaboration of this new list can result in pairs already presented in the first step. This phenomenon could or could not be accepted depending on the researcher. From the perspective of considering this step as a verification phase of previous answers, presenting a question twice is acceptable; the analogy proposed is that of an investigator who reconstructs the actions of a criminal through interrogation and who verifies the schemes that were told previously in the interrogation. However, if presenting the same question twice is not a feasible option, then it will be satisfactory to mix the order of the items to obtain new pairs.

Step 4: Second Round of Questions

In the fourth stage, a new series of questions are undertaken to verify the order obtained in the second step. This step uses the pairs elaborated from the previous step. Hence, a last sequence of N/2 evaluations is obtained.

Step 5: Integration of Responses by Matrix Iteration

In the fifth step, in order to integrate the results obtained from steps 1 to 4, a new procedure of matrix iteration is executed. The starting point is the list of comparisons done by the participant and the values assigned. There is then N+N/2 trinomes (the answers from 1 to 4).

Once this is finished, the system has positioned each item relative to the others.

Step 6: Final Order

Since we know the position of all items relative to the others, it suffices for ordering the items, to only consider the first column of the matrix. This column indicates the position of all items relative to the first (the one having number 0). This column can be ordered by the usual ordering methods.

At the end of this procedure, we obtain an ordered list of all items in increasing order, with few steps and limited errors.

An example of the method according to a preferred embodiment of the invention follows.

Consider N items X1, X2, X3, . . . , X[N] to be ordered on a single dimension

Example: car brands to be evaluated on an "attractivity" dimension

1. Mercedes-Benz C500
2. Honda Civic
3. BMW Z3
4. Toyota Corolla
5. . . .

Step 1. First Round of Questions

For each of the pairs presented, which of these cars seems the most attractive to you?

| | | | | | | | | |
|---|---|---|---|---|---|---|---|---|
| 1. BMW Z3 | ③ | 2 | 1 | 0 | 1 | 2 | 3 | Toyota Corolla |
| 2. Mercedes C500 | 3 | 2 | ① | 0 | 1 | 2 | 3 | Honda Civic |
| 3. Honda Civic | 3 | 2 | 1 | 0 | 1 | ② | 3 | BMW Z3 |
| . . . | | | | | | | | |

Step 2. Ordering Items by Matrix Iteration

Table of relative values and their corresponding scores

| Item | compared to | relative value |
|---|---|---|
| Mercedes C500 | — | 0 |
| Honda Civic | Mercedes C500 | −1 |
| BMW Z3 | Honda Civic | 2 |
| Toyota Corolla | BMW Z3 | −3 |
| . . . | | |

Matrix of Comparisons
original matrix (in parenthesis, symmetrical values, because d[x,y]=−d[y,x])

| | Honda | Toyota | BMW | Mercedes |
|---|---|---|---|---|
| Honda | — | | 2.00 | (+1) |
| Toyota | | — | (+3) | |
| BMW | (−2) | −3.00 | — | |
| Mercedes | −1.00 | | | — | first iteration

| | Honda | Toyota | BMW | Mercedes |
|---|---|---|---|---|
| Honda | — | −1.00 | 2.00 | 1 |
| Toyota | 1.00 | — | 3.00 | |
| BMW | −2.00 | −3.00 | — | −1.00 |
| Mercedes | −1.00 | | −1.00 | — | for example: the distance between Honda and Toyota is obtained by the following computation:
d[Honda,Toyota]=mean (d[Honda,Toyota], (d[Honda, BWM]+d[BMW,Toyota]),
 (d[Honda, Mercedes]+d[Mercedes,Toyota])) mean (−2, 2+−3, 1+NA)=mean (−2, −1)=−1 second iteration

| | Honda | Toyota | BMW | Mercedes |
|---|---|---|---|---|
| Honda | — | −1.00 | 2.00 | 1.00 |
| Toyota | 1.00 | — | 3.00 | 2.00 |
| BMW | −2.00 | −3.00 | — | −1.00 |
| Mercedes | −1.00 | −2.00 | 1.00 | — | last iteration

| | Honda | Toyota | BMW | Mercedes |
|---|---|---|---|---|
| Honda | — | −1.00 | 2.00 | 1.00 |
| Toyota | 1.00 | — | 3.00 | 2.00 |
| BMW | −2.00 | −3.00 | — | −1.00 |
| Mercedes | −1.00 | −2.00 | 1.00 | — |

Because the position of each item is known with respect to other ones, to order them correctly it is sufficient to consider the distance of each item with respect to a reference item, say #1 (here, Honda).

Distance of car with respect to Honda (as taken from first row):

| Car | Distance to item #1 (Honda) |
|---|---|
| Honda: | 0 |
| Toyota: | −1.00 |
| BMW: | 2.00 |
| Mercedes: | 1.00 |

A new series of scores ordered by increasing value:

Toyota Corolla, Honda Civic, Mercedes C500, BMW Z3

Step 3. Elaboration of a New List of Paired Items

To create new pairs of items, each item having an odd position (#1, #3, #5, . . . ) is paired with its consequent neighbour (#2, #4, #6, . . . )

Toyota Corolla with Honda Civic

Mercedes C500 with BMW Z3

Step 4. Second Round of Questions

For each of the pairs presented, which of these cars seems the most attractive to you?

1. Toyota Corolla  3  2  1   0  1   ②  3  Honda Civic
2. BMW Z③        3  2  1   0  1   2   3  Mercedes C500
3. . . .

Step 5. Integration of Responses by Matrix Iteration

Table of comparisons

| item | compared to | relative value |
|---|---|---|
| Honda Civic | Mercedes C500 | −1 |
| BMW Z3 | Honda Civic | 2 |
| Toyota Corolla | BMW Z3 | −3 |
| Honda Civic | Toyota Corolla | 2 |
| Mercedes C500 | BMW Z3 | −3 |
| ... | | |

Matrix of Comparisons original matrix (in parenthesis, symmetrical values, because d[x,y]=−d[y,x])

|  | Honda | Toyota | BMW | Mercedes |
|---|---|---|---|---|
| Honda | 0.00 | (−2) | 2.00 | (+1) |
| Toyota | 2.00 | 0.00 | (+3) |  |
| BMW | (−2) | −3.00 | 0.00 | (−3) −3.00 |
| Mercedes | −1.00 |  | 3.00 (3) | 0.00 | first iteration

|  | Honda | Toyota | BMW | Mercedes |
|---|---|---|---|---|
| Honda | 0.00 | −1.50 | 2.33 | 0.00 |
| Toyota | 1.50 | 0.00 | 3.50 | 1.50 |
| BMW | −2.33 | −3.50 | 0.00 | −2.00 |
| Mercedes | 0.00 | −1.50 | 2.00 | 0.00 | second iteration last iteration

|  | Honda | Toyota | BMW | Mercedes |
|---|---|---|---|---|
| Honda | 0.00 | −1.43 | 2.19 | 0.07 |
| Toyota | 1.43 | 0.00 | 3.57 | 1.50 |
| BMW | −2.19 | −3.57 | 0.00 | −2.07 |
| Mercedes | −0.07 | −1.50 | 2.07 | 0.00 |

Step 6. Final Order

Distance of car with respect to Honda (as taken from first row):

| Car | Distance to item #1 (Honda) |
|---|---|
| Honda: | 0 |
| Toyota: | −1.43 |
| BMW: | 2.19 |
| Mercedes: | 0.07 |

The final order is then (from last to first): Toyota, Honda, Mercedes, BMW

The most frequent utilization of the system and method according to a preferred embodiment of the invention concerns the ordering of a series of items relative to a unique dimension, or on several dimensions considered independent of each other.

Another utility concerns the complete integration of the procedure in a method of asking questions involving many independent dimensions. It is known that different dimensions are better evaluated if they are first grouped in one dimension (principle of similarity). For instance, to evaluate items in terms of "ability", it is preferable to first group them on the dimension of "frequency". Hence, the present invention will first be used to order the list of items relative to the first dimension and the result will serve as the basis for evaluating the items on the second dimension, and so on.

The present invention finds particular application in the surveying field, and is also appropriate for human resource personnel, in order to obtain a better profile of a candidate.

It will be understood that the present invention is appropriately embodied in a system comprised of a computer, screen and keyboard, and could be administered over a computer network, such as the Internet.

What is claimed is:

1. A method for inferring mental representations by successive comparison of items, comprising the steps of:

(a) presenting a series of N items to a participant;
   (b) asking the participant to compare each pair of items, where each item is compared with its immediate neighbour, except for the items at the two extremes which are compared to one another, so that each item is used in a pair twice, and N comparisons are done;
   (c) ordering the items by matrix iteration in order to obtain a new sequence of items;

(d) elaborating a new list of N/2 paired items, on the basis of immediate neighbours, taking each item only once;

(e) asking the participant to compare each pair of items elaborated in step (d);

(f) integrating the responses of steps (a) to (e) into a matrix; and (g) finally ordering the items based on the matrix obtained in step (f).

2. A method according to claim 1, wherein in step (b), the pairs of items are randomized before asking the participant to compare the pairs.

3. A method according to claim 1, wherein step (c) comprises the following sub-steps:

(c1) transforming a list of trinomes including a distance assigned between two items into a matrix that has as identifiers to the rows and columns the identification number of items;

(c2) iteratively positioning all the items in cells in order to cascade the inferences from one cell to another; and (c3) ordering the items in an increasing order according to their values in the matrix.

* * * * *